Patented Nov. 11, 1952

2,617,721

UNITED STATES PATENT OFFICE 2,617,721

HERBICIDES

Arthur H. Schlesinger and David T. Mowry, Dayton, Ohio, assignors to Monsanto Chemical Company, St. Louis, Mo., a corporation of Delaware No Drawing. Application September 26, 1950, Serial No. 186,922

8 Claims. (Cl. 71—2.7)

The present invention relates to herbicides and deals more particularly with methods for the general destruction of undesired plants.

A number of herbicides are known, a variety of organic and inorganic compounds having been suggested in the prior art for use as plant-killers. Among disadvantages of prior herbicides may be mentioned corrosive effect on equipment, water-insolubility (and hence the necessity of flammable organic or obnoxious spray media), chemical reactivity with other components customarily employed in agricultural sprays or powders, instability when exposed for long periods of time to ordinary atmospheric conditions, and soil instability, e. g., chemical reactivity and susceptibility to decomposition by soil microorganisms which results in loss of the active material.

Now we have found that highly stable, non-corrosive herbicidal compositions are obtained by employing as the active ingredient a compound having the general formula

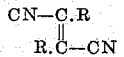

in which R is selected from the class consisting of hydrogen and chlorine. Compounds having the above general formula are fumaronitrile, chlorofumaronitrile and dichlorofumaronitrile.

These compounds are effective herbicides over wide ranges of concentrations. Their effectiveness may be measured by determining the inhibition of root growth as compared to similar untreated plants. The general usefulness of a herbicide may be measured by comparing the concentrations of a herbicide required to produce a certain inhibition on a broad-leafed plant with the concentrations of a herbicide required to produce the same inhibition on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The invention is further illustrated but not limited by the following examples:

Example 1

Herbicidal activity of the nitriles listed in the table below was determined by germination of cucumber seeds for 4 days at a temperature of 76° F. in the presence of aqueous suspensions of each of the indicated chemicals at concentration of 100 p. p. m. Seventy five seeds were used for each test. The results are expressed as per cent length of the primary roots in the presence of the chemical compared with the length of the primary roots of controls which had been germinated in water. The activity of two standard herbicides as obtained by the same test are included for comparison.

| Compound Tested | Percent Growth at 100 Parts per Million |
|---|---|
| Fumaronitrile | 0 |
| Chlorofumaronitrile | 0 |
| 2,4-Dichlorophenoxyacetic acid | 6 |
| Isopropyl carbanilate | 14 |

Similarly good results may be obtained with dichlorofumaronitrile.

The herbicidal efficiency of the fumaronitrile and its chloro-derivatives is remarkable, because as shown in the table given below nitriles do not generally possess great herbicidal efficiency. When tested as described above, aqueous suspensions of a random group of such derivatives were found to have the following effects:

| Compound Tested | Percent Growth at 100 Parts per Million |
|---|---|
| Mesacononitrile | 51 |
| Succinonitrile | 86 |
| Phenylsuccinonitrile | 77 |
| Cyanoacetic Acid | 65 |
| 4,4'-Dicyanostilbene | 82 |
| Dicyanoethyl fumarate | 80 |
| Dicyanoethyl ether | 96 |

Example 2

Fumaronitrile and chlorofumaronitrile were tested with both cucumber and wheat seeds and the percentage of growth inhibition measured for various concentrations. The concentration of each compound which permitted 20 per cent of normal growth (80 per cent inhibition) was determined for seeds of cucumber and wheat, respectively. The following results, expressed as parts per million of the herbicide, were obtained:

|  | Cucumber | Wheat | Ratio |
|---|---|---|---|
| Fumaronitrile | 6 | 16 | 2.6 |
| Chlorofumaronitrile | 8 | 18 | 2.3 |

Example 3

The activity of fumaronitrile was also demonstrated as follows:

Emulsions of fumaronitrile were prepared, using cyclohexanone as solvent and as an emulsifier a mixture consisting 65% of a surface-active agent known to the trade as "Sterox CD" and 35% of a surface-active agent known to the trade as "Santomerse 43."

The fumaronitrile was used at two different concentrations. Emulsion I contained one part of the nitrile per 100 parts of solvent and emulsion II contained one part of the nitrile per 315 parts of the solvent.

Potted plants of string bean and corn were treated with each of the above emulsions, the beans being treated when the second leaves were well developed and the corn when 9 to 12 inches high. Treatment was effected by dipping the plants in the emulsion, draining off excess emulsion, and maintaining the pots in a greenhouse for a period of two weeks. Observation of the plants at the end of that time showed that at both concentrations the foliage of the bean and corn plants was completely withered and the plants were dead. At the lower concentration the bean plants had been defoliated.

Fumaronitrile and its chloro-derivatives are preferably applied by spraying aqueous suspensions of the same, this method affording an easy and inexpensive way of destroying plant growth. However, the present nitriles are likewise effective when applied as dusts, for example, in admixture with such carriers as clay, lime, talc, bentonite, pumice, fuller's earth, etc. The present compounds are soluble in the usual organic solvents and may be used in solution, e. g., in kerosene or benzene solution as herbicidal sprays.

The sprays or dusts may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

Only small amounts of the present herbicidal materials need be employed. For general utility, concentrations of from, say, 0.1 part to 20 parts of the nitrile per hundred parts by weight of the carrier may be employed, and in this manner an acre of land may be freed of plants by application of only a few pounds of one of the present herbicides.

What we claim is:

1. A method for destroying undesired plants which comprises applying to said plants a toxic quantity of a herbicidal composition comprising, as the active ingredient, a compound selected from the class consisting of fumaronitrile, chlorofumaronitrile and dichlorofumaronitrile.

2. A method for destroying undesired plants which comprises applying to said plants a toxic quantity of a herbicidal composition comprising fumaronitrile as the active ingredient.

3. A method for destroying undesired plants which comprises applying to said plants a toxic quantity of a herbicidal composition comprising chlorofumaronitrile as the active ingredient.

4. A method for destroying undesired plants which comprises applying to said plants a toxic quantity of a herbicidal composition comprising dichlorofumaronitrile as an active ingredient.

5. A method for destroying undesired plants which comprises applying to said plants a toxic quantity of a herbicidal composition including a carrier and as an active ingredient a compound selected from the class consisting of fumaronitrile, chlorofumaronitrile, and dichlorofumaronitrile.

6. A method for destroying undesired plants which comprises applying to said plants a toxic quantity of a herbicidal composition comprising an aqueous suspension of a compound selected from the class consisting of fumaronitrile, chlorofumaronitrile, and dichlorofumaronitrile.

7. A method of destroying undesired plants which comprises applying to said plants a toxic quantity of an aqueous suspension of fumaronitrile.

8. A method of destroying undesired plants which comprises applying to said plants a toxic quantity of an aqueous suspension of chlorofumaronitrile.

ARTHUR H. SCHLESINGER.
DAVID T. MOWRY.

REFERENCES CITED

The following references are of record in the file of this patent:

UNITED STATES PATENTS

| Number | Name | Date |
|---|---|---|
| 2,399,349 | Hochwalt | Apr. 30, 1946 |